(12) United States Patent
Cherubini et al.

(10) Patent No.: US 7,881,008 B2
(45) Date of Patent: Feb. 1, 2011

(54) JOINT SPECIFICATION OF SERVO FORMAT AND SERVO READER PARAMETERS FOR TAPE DRIVE SYSTEMS

(75) Inventors: Giovanni Cherubini, Rueschlikon (CH); Roy D. Cideciyan, Rueschlikon (CH); Laurent A. Dellmann, Adliswil (CH); Evangelos S. Eleftheriou, Rueschlikon (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/117,899

(22) Filed: May 9, 2008

(65) Prior Publication Data

US 2009/0279201 A1    Nov. 12, 2009

(51) Int. Cl.
*G11B 5/584* (2006.01)
(52) U.S. Cl. .................................... 360/77.12
(58) Field of Classification Search ............... 360/77.12, 360/77.13, 78.02, 134, 53, 72.2, 75, 76
See application file for complete search history.

(56) References Cited

U.S. PATENT DOCUMENTS

| | | | |
|---|---|---|---|
| 5,068,757 A * | 11/1991 | Hughes et al. ............ 360/77.13 |
| 5,689,384 A | 11/1997 | Albrecht et al. | |
| 5,930,065 A | 7/1999 | Albrecht et al. | |
| 6,021,013 A | 2/2000 | Albrecht et al. | |
| 6,141,174 A | 10/2000 | Judge et al. | |
| 6,169,640 B1 | 1/2001 | Fasen | |
| 6,282,051 B1 | 8/2001 | Albrecht et al. | |
| 6,542,235 B1 | 4/2003 | Caskey et al. | |
| 6,842,305 B2 | 1/2005 | Mosltad et al. | |
| 6,879,457 B2 | 4/2005 | Eaton et al. | |
| 6,943,979 B2 * | 9/2005 | Goker et al. ............. 360/77.12 |
| 7,142,388 B2 * | 11/2006 | Tateishi et al. .......... 360/77.12 |
| 7,245,453 B2 * | 7/2007 | Koski et al. ............. 360/77.12 |
| 7,522,371 B2 * | 4/2009 | Koski et al. ............. 360/77.12 |
| 7,522,372 B2 * | 4/2009 | Koski et al. ............. 360/77.12 |
| 7,602,578 B2 * | 10/2009 | Tateishi et al. .......... 360/77.12 |
| 7,742,254 B2 * | 6/2010 | Cherubini et al. ........ 360/77.12 |
| 2005/0259349 A1 * | 11/2005 | Koski et al. ............. 360/77.12 |
| 2008/0285171 A1 * | 11/2008 | Tanaka et al. ............ 360/77.12 |

OTHER PUBLICATIONS

Douglas W. Johnson, "Modified time-based servo enables increased track density on tape"; http://www.thefreelibrary.com; Mar. 20, 2008/ pp. 1-3; Disaster Recovery & Backup/Restore, Computer Technology Review, Aug. 1, 2005.
Giovanni Cherubini et al.; "Servo Channel for Tape Drive Systems"; U.S. Appl. No. 11/969,184, filed Jan. 3, 2008.

* cited by examiner

*Primary Examiner*—Fred Tzeng
(74) *Attorney, Agent, or Firm*—Cantor Colburn LLP; Stephen Kaufman

(57) ABSTRACT

A servo pattern, including stripes arranged in servo bursts for use in position error signal (PES) generation, is provided in which a stripe width is narrower than 1.7 μm and in which the stripes are oriented at an azimuth angle which in absolute value is equal to or larger than 6 degrees.

19 Claims, 5 Drawing Sheets

JOINT SPECIFICATION OF SERVO FORMAT AND SERVO READER PARAMETERS FOR TAPE DRIVE SYSTEMS

CROSS REFERENCE TO RELATED APPLICATIONS

This application is related to an application entitled: "Head Design for Writing Servo Patterns on Magnetic Tape", which is being filed in the USPTO on May 9, 2008 as File No. CH920080049US1.

BACKGROUND OF THE INVENTION

1. Field of the Invention

Aspects of the present invention are directed to specifications for a servo pattern and, more particularly, to specifications for a servo pattern with a relatively narrow stripe width.

2. Description of the Background

The recording and reading of data in tracks on magnetic storage media requires precise positioning of magnetic read/write heads. The heads must be quickly moved to, and maintained centered over, particular data tracks as recording and reading of data to and from the data tracks occurs. In particular, the heads must reliably record and read data as relative movement occurs between the heads and the magnetic storage media.

Storage devices, including the magnetic read/write heads that read and record data on magnetic media, typically use servo control systems to properly position the heads relative to the magnetic media. The servo control systems derive a position signal that is generated from the reading of servo control information that is recorded in servo tracks on the media and which is used in feedback servo control loops to maintain a position of the heads.

SUMMARY OF THE INVENTION

In accordance with an aspect of the invention, a servo pattern of a linear magnetic tape onto and/or from which information is written and/or read by a tape drive, including at least one servo reader, is provided and includes stripes, which each have a stripe width that is narrower than 1.7 μm and which are each oriented at an azimuth angle which in absolute value is equal to or larger than 6 degrees, arranged in servo bursts that are detected by the at least one servo reader for use in position error signal (PES) generation.

In accordance with an aspect of the invention, a system for improving the accuracy of the estimation of the lateral head position is provided, which leads to improved position error signal (PES) quality, and includes a substrate on which a servo pattern is provided, the servo pattern including stripes arranged in servo bursts for use in position error signal (PES) generation, in which a stripe width is narrower than 1.7 μm and in which the stripes are oriented at an azimuth angle which in absolute value is equal to or larger than 6 degrees, an actuator, including a head to detect the servo pattern of the substrate, and a controller, coupled to the actuator, to control a position of the head via the actuator in accordance with the servo pattern.

In accordance with an aspect of the invention, a method of optimizing a standard deviation of a position error signal (PES) detected from a servo pattern, including stripes arranged in servo bursts, is provided and includes setting a stripe width at a value which is narrower than 1.7 μm, setting an azimuth angle of the stripes to be in absolute value 6 degrees or larger, and determining an optimal reader width, which leads to a minimum value of the standard deviation of the PES, with respect to the set stripe width and the set azimuth angle.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
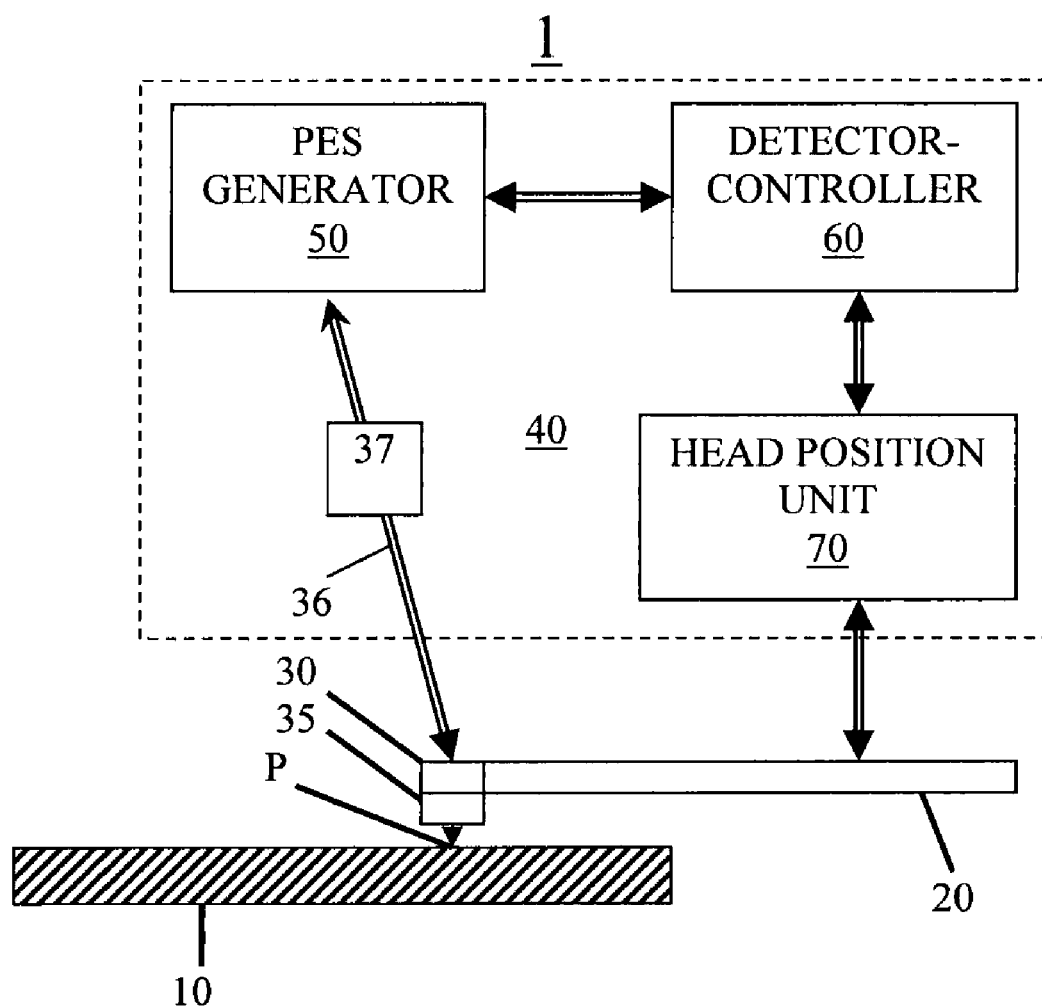
FIG. 1 is a schematic view of a system for improving position error signal (PES) quality in accordance with an embodiment of the invention.
Figure 2:
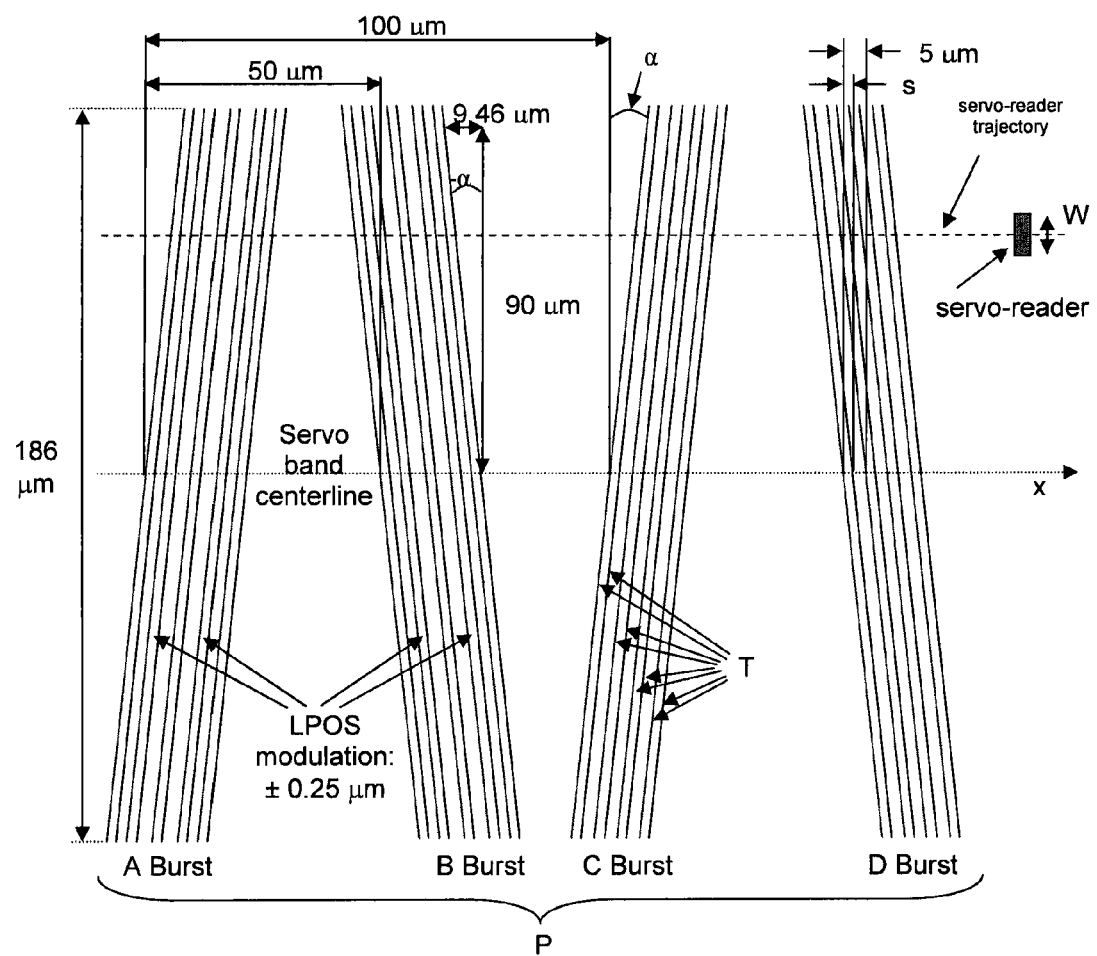
FIG. 2 is an exemplary geometry of the servo pattern P of a linear tape format.

With reference to FIGS. 1 and 2, in linear tape drives employing timing-based servo (TBS) technology, information is read from and/or is written to linear magnetic tape by a head 30, including at least one servo reader 35, which moves with respect to the linear tape and which is positioned relative to the linear tape in accordance with a servo control signal that is responsive to a position error signal (PES). The quality of the PES is inversely proportional to a standard deviation of the PES. Thus, a reduction in the PES standard deviation results in an improvement in the quality of the PES.

Accordingly, a system 1 is provided that reduces the standard deviation of the PES and which thereby improves the quality of the PES. As shown in FIG. 1, the system 1 includes a substrate 10, such as a recording surface of the magnetic linear tape, on which the servo pattern P is provided. An actuator 20, including a head 30 is disposed proximate the linear tape. The head 30 includes at least one servo reader 35 which detects the servo pattern P in accordance with methods well known in the art. The actuator 20 positions the head 30 proximate the servo pattern P in accordance with the detected servo pattern P and servo control algorithms which are also well known in the art.

Controller 40 executes the servo control algorithms and may be a computing system and/or may be embodied as computer readable media having stored executable instructions for carrying out the servo control algorithms. In any case, the controller 40 may include a PES generator 50, which generates the PES from the detected servo pattern P, a detector-controller 60, which analyzes the PES and thereby determines whether the head 30 needs to be repositioned with respect to the servo pattern P, and a head position unit 70. The head position unit 70 generates servo control signals that cause the actuator 20 to move the head 30 in accordance with the determinations of the detector-controller 60.

The at least one servo reader 35 may be coupled to a synchronous servo channel 36 that employs a matched-filter interpolator/correlator 37. The matched-filter interpolator/correlator 37 provides for signal filtering at both a constant linear tape velocity relative to the at least one servo reader 35 and during acceleration and deceleration of the linear tape relative to the at least one servo reader 35. The synchronous servo channel thus provides for the generation of y-estimates and linear tape velocity estimates, which are each employed in the servo control of the head 30 and which will be described below.

In accordance with the invention, the linear tape is spooled/unspooled by, e.g., magnetic tape reels, and passes by the at least one servo reader 35 of the head 30 during read/write operations such that the at least one servo reader 35 moves relative to the recording surface of the linear tape. As shown in FIG. 2, the servo pattern P, e.g., the A burst, the B burst, the C burst and the D burst, may include sets of organized magnetic transitions T with azimuth slopes ±α, although it is understood that various angles may be employed and that they may not all have similar absolute values. Each stripe is thus associated with a pair of magnetic transitions. The servo patterns P also allow for the encoding of longitudinal position (LPOS) information by shifting transitions from their nominal pattern position. The servo pattern P is recorded on the linear tape for the purpose of providing for a generation of the servo control signal that maintains the head 30 in proper read/write positions.

An exemplary geometry of the servo pattern P of a linear tape format is shown in FIG. 2. As may be seen, the head 30, including the at least one servo reader 35, traverses the servo pattern P along a line that is parallel to the servo band centerline. In this manner, the at least one servo reader 35 sequentially detects the five stripes in the A burst (e.g., the ten magnetic transitions T in the A Burst), the five stripes in the B burst, the four stripes in the C burst, and, finally, the four stripes in the D burst. The y-estimates of the position of the head 30, from which the position error signal (PES) is generated, are each obtained from the relative timing of pulses generated by the at least one servo reader 35 as the at least one servo reader 35 reads the servo pattern P while the head 30 moves along the linear tape.

The y-estimates reflect respective positions of the head 30 and the at least one servo reader 35 with respect to the linear tape whereas the linear tape velocity is a measurement of the speed of the tape in the longitudinal direction. The standard deviation of the PES, is obtained from comparisons between the y-estimates with predetermined conditions and indicates a degree by which the head 30 departs from an optimum position (e.g., the band centerline) relative to the linear tape. Thus, a reduction in a value of the standard deviation of the PES reflects a situation in which the head 30 is relatively close to its respective optimum position.

For TBS systems, a value of the standard deviation of the PES depends on the parameters chosen for the definition of the servo patterns P. These parameters include the azimuth angle α, a width W of the at least one servo reader 35, and a servo stripe width s (see FIG. 2). In accordance with various embodiments of the invention, sets of the parameters α, W and s have been determined as being optimized to thereby reduce the standard deviation of the PES.

For example, the stripe width s of the servo pattern P may be narrower than 1.7 μm or, more particularly, inclusively within a range from 1.0 to 1.5 μm. The stripes may be oriented with the servo bursts at azimuth angle ±α, which in absolute value is equal to or larger than 6 degrees or, more particularly, 12, 15 or 18 degrees. Lastly, the width W of the at least one servo reader 35 may be anywhere from about 1 to 4.5 μm or, more particularly, 1 μm, 1.5 μm, 2 μm, 3 μm or 4.5 μm. The servo bursts of the servo pattern P may be further characterized as having one of a "V" shaped pattern, an "N" shaped pattern or an "M" shaped pattern with respect to one another. The stripes may also be further arranged within the servo bursts with pulse-position modulation to encode longitudinal position (LPOS) information.

Figure 3A:
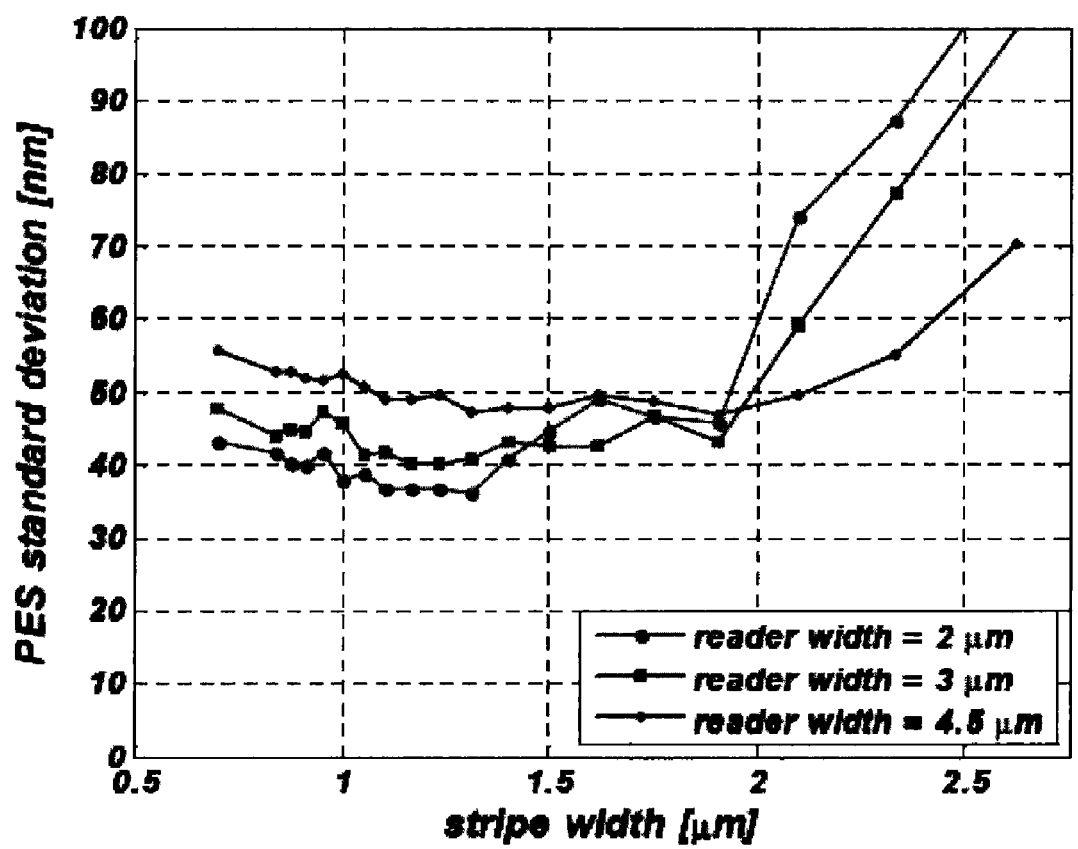
FIGS. 3A, 3B and 3C are graphs of position error signal (PES) standard deviations vs. stripe widths for various azimuth angles in accordance with embodiments of the invention.
Figure 3B:
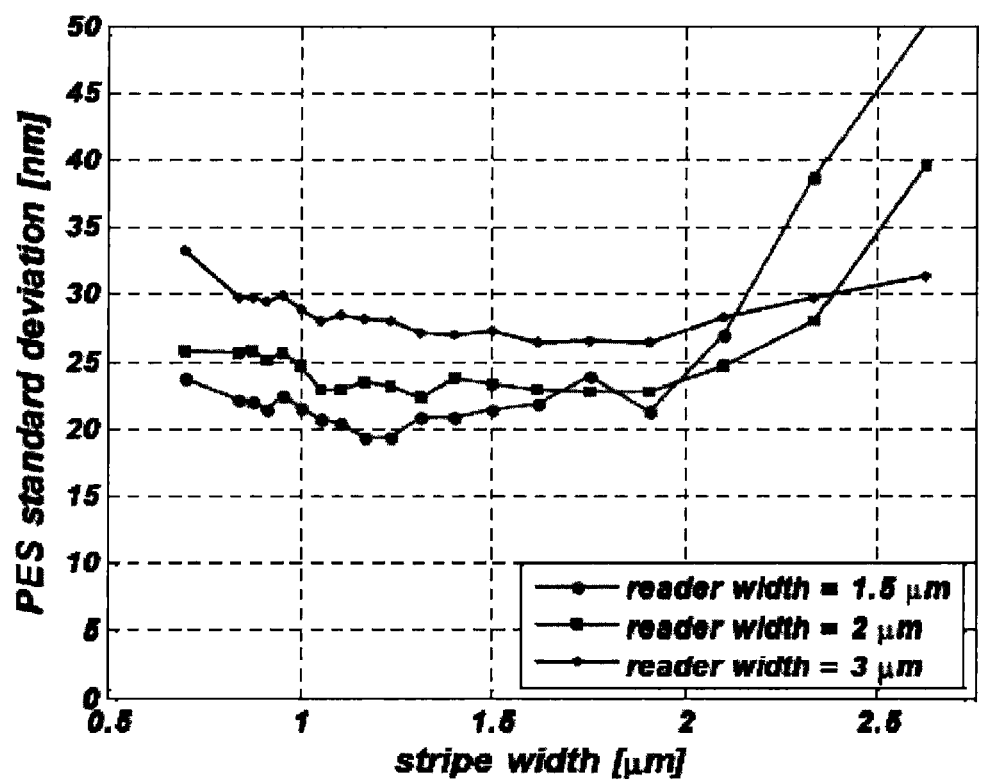
Figure 3C:
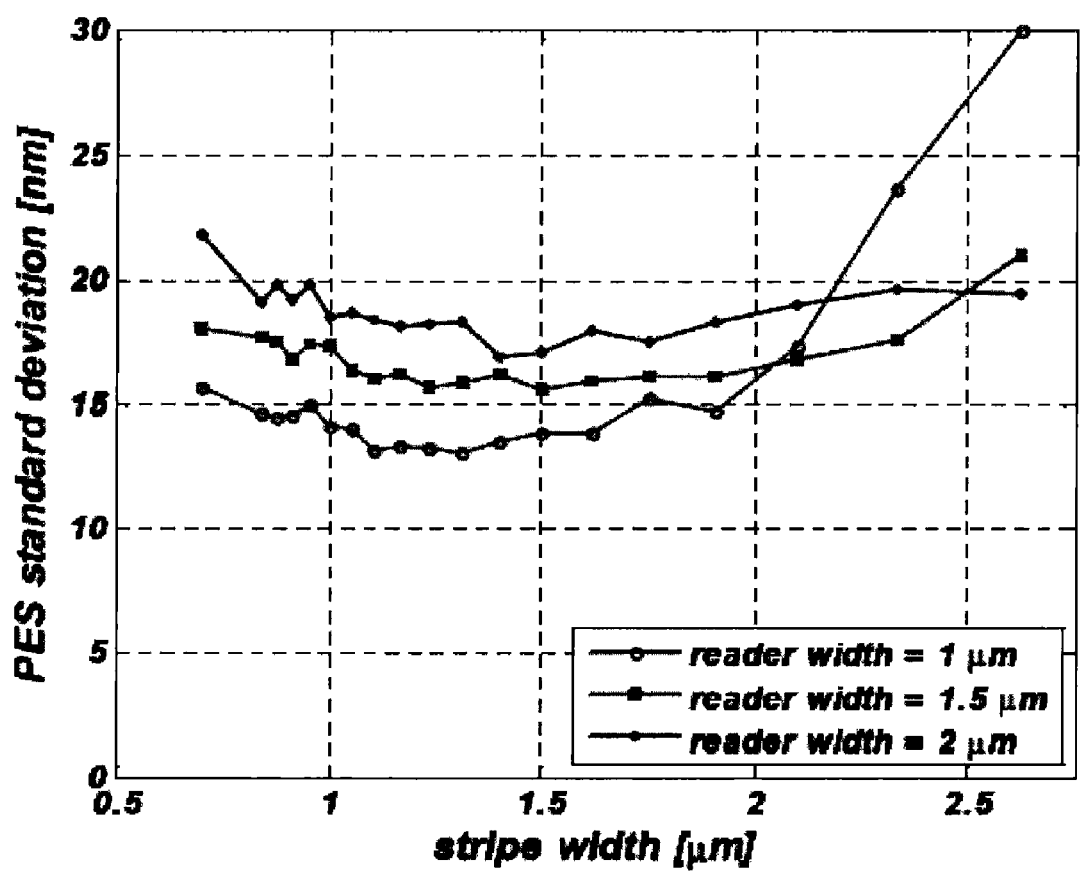

The optimality of the various embodiments of the servo pattern, P, is illustrated in FIGS. 3A-C, each of which shows a plot of PES standard deviation vs. stripe width, s, for various choices of the azimuth angle, α, and signal-to-noise ratio at the input of the servo channel being equal to 20 dB. As shown, for each absolute value of α (e.g., 6 degrees, 12 degrees and 18 degrees), if the stripe width s is chosen within the interval of about 1.0-1.5 μm, inclusively, a corresponding value of the reader width W can be found. Such a value of the reader width W leads to an optimization of the PES standard deviation. For example, as shown in FIG. 3A, if the stripe width s is 1.25 μm, minimum values of PES standard deviation are achieved if α=±6 degrees and W=2 μm, 3 μm or 4.5 μm. Similarly, as shown in FIG. 3B, minimum values of PES standard deviation are achieved if α=±12 degrees and W=1.5 μm, 2 μm or 3 μm. Further, as shown in FIG. 3C, minimum values of PES standard deviation are achieved if α=±18 degrees and W=1 μm, 1.5 μm or 2 μm.

The simulation results shown in FIGS. 3A-C have been obtained by assuming that the proportions of the servo pattern P remain the same while the servo stripe width s is changed. Therefore, the spacing between stripes and the modulation depth for LPOS encoding also scale in a similar fashion as the stripe width. For example, if the stripe width is 1.05 μm, i.e., the stripe width is halved with respect to a standard linear tape format, the nominal spacing between stripes is 1.45 μm, and the modulation depth becomes 0.125 μm. In this case, the length of a servo frame is equal to 100 μm, thus doubling the generation rate of the y-estimates as compared to the standard generation rate.

In accordance with another aspect of the invention, a method of optimizing a standard deviation of a position error signal (PES) detected from servo pattern P, including stripes arranged in servo bursts, is provided. The method includes setting a stripe width, s, at a value which is narrower than 1.7 μm, setting an azimuth angle, α, of the stripes to be in absolute value 6 degrees or larger, and determining an optimal reader width, W, which leads to a minimum value of the standard deviation of the PES, with respect to the set stripe width, s, and the set azimuth angle, α. Here, the setting of the stripe width, s, comprises setting the stripe width, s, at a value which is narrower than a spacing between the stripes.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A servo pattern of a linear magnetic tape onto and/or from which information is written and/or read by a tape drive, including at least one servo reader, the servo pattern including stripes, which each have a stripe width that is narrower than 1.7 μm and which are each oriented at an azimuth angle which in absolute value is equal to or larger than 6 degrees, each of the stripes being arranged in servo bursts that are detected by the at least one servo reader for use in position error signal (PES) generation.

2. The servo pattern according to claim 1, wherein the stripe width is inclusively within an interval from about 1.0 to 1.5 µm.

3. The servo pattern according to claim 2, wherein a width of the at least one servo reader is inclusively within an interval from about 2 µm to 4.5 µm.

4. The servo pattern according to claim 2, wherein the azimuth angle in absolute value is larger than 6 degrees.

5. The servo pattern according to claim 2, wherein the azimuth angle in absolute value is 12 degrees and a width of the at least one servo reader is inclusively within an interval from 1.5 µm to 3 µm.

6. The servo pattern according to claim 2, wherein the azimuth angle in absolute value is 18 degrees and a width of the at least one servo reader is inclusively within an interval from 1 µm to 2 µm.

7. The servo pattern according to claim 1, wherein the servo bursts are arranged with respect to one another in one of a "V" shaped pattern, an "N" shaped pattern or an "M" shaped pattern.

8. The servo pattern according to claim 1, wherein the stripes are arranged in the servo bursts with pulse position modulation to encode longitudinal position (LPOS) information.

9. A system for improving position error signal (PES) quality, comprising:
    a substrate on which a servo pattern is provided, the servo pattern including stripes arranged in servo bursts for use in position error signal (PES) generation, in which a stripe width is narrower than 1.7 µm and in which the stripes are oriented at an azimuth angle which in absolute value is equal to or larger than 6 degrees;
    an actuator, including a head to detect the servo pattern of the substrate; and
    a controller, coupled to the actuator, to control a position of the head via the actuator in accordance with the servo pattern.

10. The system according to claim 9, wherein the head of the actuator comprises at least one servo reader to detect the servo pattern.

11. The system according to claim 10, wherein the stripe width is inclusively within an interval from about 1.0 to 1.5 µm.

12. The system according to claim 11, wherein a width of the at least one servo reader is inclusively within an interval from 2 µm to 4.5 µm.

13. The servo pattern according to claim 11, wherein the azimuth angle in absolute value is larger than 6 degrees.

14. The servo pattern according to claim 11, wherein the azimuth angle in absolute value is 12 degrees and a width of the at least one servo reader is inclusively within an interval from 1.5 µm to 3 µm.

15. The servo pattern according to claim 11, wherein the azimuth angle in absolute value is 18 degrees and a width of the at least one servo reader is inclusively within an interval from 1 µm to 2 µm.

16. The servo pattern according to claim 9, wherein the servo bursts are arranged with respect to one another in one of a "V" shaped pattern, an "N" shaped pattern or an "M" shaped pattern.

17. The servo pattern according to claim 9, wherein the stripes are arranged in the servo bursts with pulse position modulation to encode longitudinal position (LPOS) information.

18. A method of optimizing a standard deviation of a position error signal (PES) detected from a servo pattern, including stripes arranged in servo bursts, the method comprising:
    setting a stripe width at a value which is narrower than 1.7 µm;
    setting an azimuth angle of the stripes to be in absolute value 6 degrees or larger; and
    determining an optimal reader width, which leads to a minimum value of the standard deviation of the PES, with respect to the set stripe width and the set azimuth angle.

19. The method according to claim 10, wherein the setting of the stripe width comprises setting the stripe width at a value which is narrower than a spacing between the stripes.

* * * * *